Figure 1:
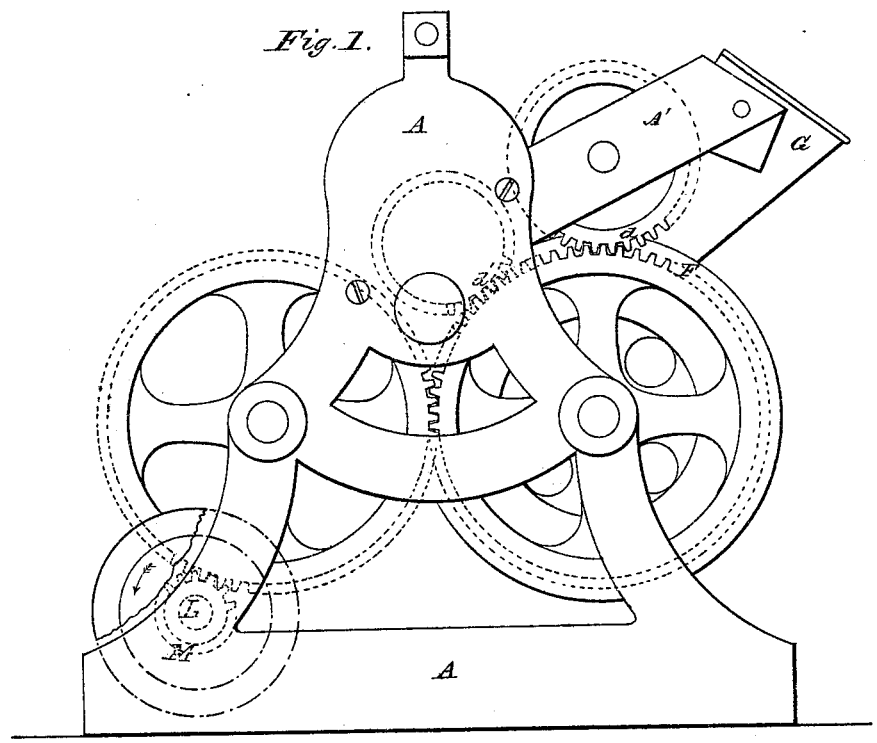

JAMES C. CULVER.
Improvement in Brick-Machines.

2 Sheets--Sheet 1.

No. 126,618.

Patented May 7, 1872.

Witnesses:

Inventor:
James C. Culver

2 Sheets--Sheet 2.

JAMES C. CULVER.
Improvement in Brick-Machines.

No. 126,618. Patented May 7, 1872.

Witnesses:

Inventor:
James C. Culver 126,618

UNITED STATES PATENT OFFICE.

JAMES C. CULVER, OF ST. LOUIS, MISSOURI, ASSIGNOR OF PART OF HIS RIGHT TO THOMAS ELWOOD AND CHARLES H. THOMPSON, OF CLEVELAND, OHIO.

IMPROVEMENT IN BRICK-MACHINES.

Specification forming part of Letters Patent No. 126,618, dated May 7, 1872.

Specification describing certain Improvements in Brick-Machines, invented by JAMES C. CULVER, of St. Louis, county of St. Louis, and State of Missouri.

*To all whom it may concern:*

Be it known that I, JAMES C. CULVER, of St. Louis, in the county of St. Louis and State of Missouri, have invented certain new and useful Improvements in Brick-Machines; and I do hereby declare that the following is a full, clear, and exact description thereof, reference being had to the accompanying drawing forming a part of the same.

Like letters on the drawing refer to like parts.

Figure 2:
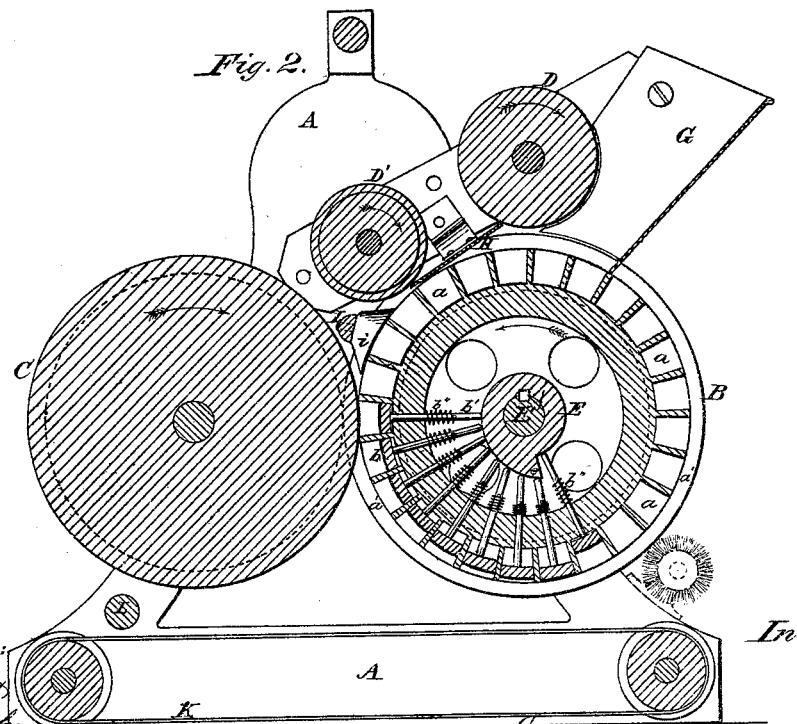
Figure 3:
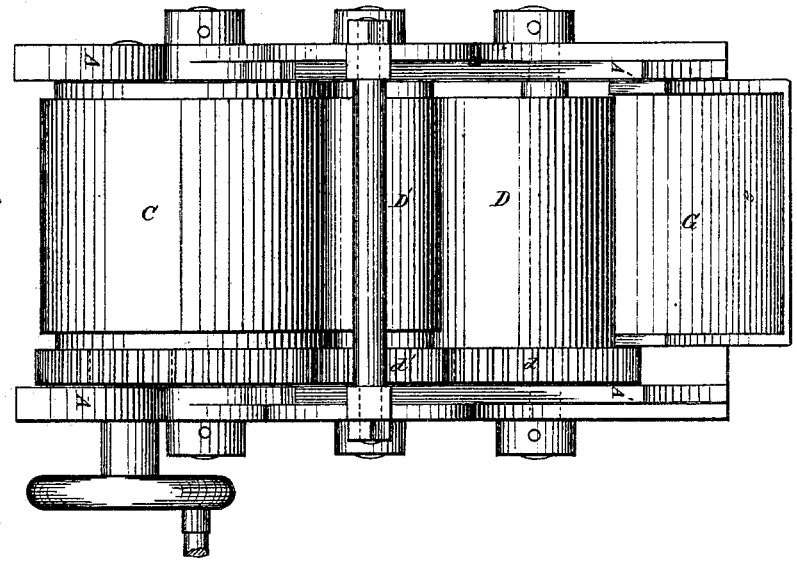
Figure 4:
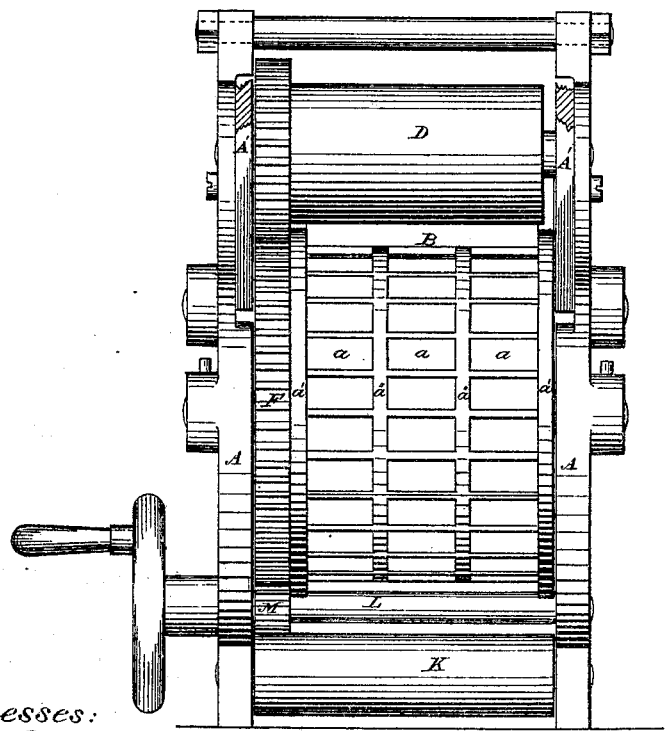
Figure 5:
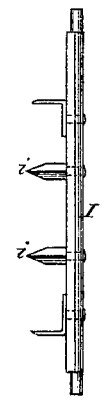

Figure 1 is a side elevation of the machine. Fig. 2 is a vertical cross-section of the same. Fig. 3 is a plan view. Fig. 4 is an end view with the hopper removed. Fig. 5 is a detail view of the knives and scrapers.

The object of this machine is to make what are technically called "dry-pressed bricks"—that is, to use the clay from the bank without being tempered and to make them of a concavo-convex form.

In the drawing, A represents a frame of suitable construction, provided with bearings for the journals of the mold-cylinder B and pressure-roller C, and also the auxiliary or feed-rollers D D', all made of iron or other suitable material. The mold-cylinder B is provided with one or more rows of molds, $a\ a$, into which followers $b$ fit. They may be made of brass or copper, or iron lined with brass or copper, to prevent any sticking of clay or rusting, and have an arbor or stem, $b'$, which passes through the center of each mold, and is provided with a spring, $b''$, to retract the followers to their seats as soon as the point $e$ of the cam E is passed. Said cam is secured to the stationary shaft E'. The followers are made convex on their outer face, or they may be made with a countersink. Around the shaft E the mold-wheel loosely revolves, and has a suitable gear-wheel, F, on one end, which meshes into another of the same size on the pressure-roller C. Said pressure-roller C has a solid face, and is provided with a recess or groove on each end, into which flanges $a'\ a'$ of the mold-cylinder fit, thereby preventing any clay from passing over the edges of said roller. These rollers are placed in close contact with each other, so that the convex surface of C fits and tightly presses against the molds of the mold-cylinder, thereby giving a convex surface to the adjacent side of the brick. A hopper, G, is placed at one side of the mold-cylinder, and in the rear of it and over the said mold-cylinder are placed the feed-rollers D D', each provided with a pinion, $d\ d'$, which mesh into the gear-wheel F, and both are supported in an auxiliary frame, A'. Between these rollers is arranged a spring-scraper, H, for cleaning them. Just above the junction of the mold-cylinder B and pressure-roller C is arranged a bar, I, to which is attached a number of V-shaped knives, $i\ i$, shown in Fig. 5, whose object is to remove any clay from the peripheral partitions $a''$, Fig. 4, between the molds, dividing and guiding the material into or over said molds on each side, thereby keeping the cylinder clean. On the rear side of the mold-cylinder a brush may be arranged for more thoroughly cleaning it and the followers, if desired. A suitable endless belt or carrier, K, may be placed under the mold-wheel to receive and convey the bricks away. Power is applied to the shaft L and pinion M and the machine set in motion.

The operation is as follows: The clay being first ground in a crushing-mill (not shown) without being tempered, it falls into the hopper G, and is thence forced into the molds $a$ by the auxiliary or feed rollers D D', which expel the air-bubbles and form a compact mass of the clay, which is finally pressed into the molds by the main pressure-roller C, which gives the bricks a convex form on their exterior surface, while the followers give them the concave side. As the mold-cylinder rotates the follower-stems traverse the periphery of the scroll-shaped cam E, by which the bricks are gradually forced outward and finally expelled from their molds and delivered upon the apron K. When the follower-stems have passed the point $e$ of the cam they are suddenly retracted by the springs $b''$ to their original position, thus leaving the mold again vacant for the reception of a new charge of clay.

One of the important features of this machine is the concavo-convex form given the bricks, thus conferring the peculiar resisting power of an arch, as well as providing a means of binding them more securely together by the mortar.

I am aware that brick have been made of a curve form for constructing arches, but I am not aware that brick of the kind herein described have been used for building straight walls. By being pressed dry no time is lost in drying them and they can be burned at once.

Having thus described my invention, what I claim, and desire to secure by Letters Patent, is—

1. The combination of the mold-cylinder B, pressure-roller C, feed-rollers D D', and scrapers H and I, all constructed and operating as herein set forth.

2. The pressure-roller C, in combination with the mold-cylinder B having followers $b$, when said followers are made convex on their face, and all arranged as shown and for the purpose set forth.

3. The arrangement of the mold-cylinder B, main pressure-wheel C, feed-rollers D D', scrapers H I, and hopper G, all constructed and operating substantially as set forth.

JAMES C. CULVER.

Witnesses:
T. C. BRECHT,
C. H. THOMPSON.